United States Patent
Lennert et al.

(10) Patent No.: US 6,453,032 B1
(45) Date of Patent: Sep. 17, 2002

(54) METHOD FOR CREATING AND MODIFYING SIMILAR AND DISSIMILAR DATABASES FOR USE IN DIALING PLAN CONFIGURATIONS FOR TELECOMMUNICATION SYSTEMS

(75) Inventors: Joseph Francis Lennert, Bolingbrook; Jeffrey W. Lev, Crystal Lake; William T. Mahaney, Yorkville; Charlene Ros, Aurora, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/054,094

(22) Filed: Apr. 2, 1998

(51) Int. Cl.[7] .................. H04M 15/00; H04M 7/00; G06F 17/30
(52) U.S. Cl. .................. 379/121.04; 379/112.05; 379/134; 379/141; 379/219; 707/102
(58) Field of Search .................. 379/1.01, 9.05, 379/15.01, 32.01, 121.01, 121.05, 121.02, 242, 112.01, 112.02, 112.05, 126, 141, 204; 707/102, 203, 201, 204

(56) References Cited

U.S. PATENT DOCUMENTS

| | | | | | |
|---|---|---|---|---|---|
| 5,915,559 | A | * | 9/1998 | Schnable | 379/112 |
| 5,937,343 | A | * | 8/1999 | Leung | 455/403 |
| 6,085,194 | A | * | 7/2000 | Ige et al. | 707/10 |
| 6,108,669 | A | * | 8/2000 | Dalenberg et al. | 707/203 |
| 6,243,712 | B1 | * | 6/2001 | Lennert et al. | 707/104 |
| 6,263,060 | B1 | * | 7/2001 | McLampy et al. | 379/114 |
| 6,272,496 | B1 | * | 8/2001 | Lennert et al. | 707/102 |
| 6,298,045 | B1 | * | 10/2001 | Pang et al. | 370/261 |
| 6,301,477 | B1 | * | 10/2001 | Lennert et al. | 455/433 |
| 6,324,547 | B1 | * | 11/2001 | Lennert et al. | 707/204 |

FOREIGN PATENT DOCUMENTS

| | | |
|---|---|---|
| EP | 0 96 25715 | 8/1996 |
| EP | 0 750 434 | 12/1996 |

* cited by examiner

*Primary Examiner*—Binh Tieu
(74) *Attorney, Agent, or Firm*—Grossman Patti & Brill

(57) ABSTRACT

This invention uses a computer program to mine preexisting dialing plan data located in a variety of preexisting source dialing plan databases. The computer program either creates a new dialing plan database from parts of existing dialing plan databases or modifies an existing dialing plan database. The computer program replaces the current system's reliance upon manual data entry by data engineers to configure the operation of a new telecommunication switch or replace the software in a telecommunication switch that was damaged or requires a new dialing plan data configuration. This invention provides accurate and timely customer information, significantly decreases the time interval for engineering a new dialing plan database, decreases the research and data entry time, decreases the interval for lab planning and project management, improves dialing plan database integrity, provides a cleaner dialing plan database, reuses existing dialing plan data eliminating double data entry, reuses some existing software code, and uses preexisting office data administration tools and provides a platform for future growth and expandability. By accomplishing these tasks, the telecommunication switch manufacturer or telecommunication switch operator saves time, money and decreases time-to-market product and service schedules.

41 Claims, 10 Drawing Sheets

METHOD FOR CREATING AND MODIFYING SIMILAR AND DISSIMILAR DATABASES FOR USE IN DIALING PLAN CONFIGURATIONS FOR TELECOMMUNICATION SYSTEMS

FIELD OF THE INVENTION

This invention relates to a computer program that can create new dialing plan databases from all or parts of one or more existing dialing plan databases containing data information for the operation of data and voice audio telecommunication switches.

DESCRIPTION OF THE PRIOR ART

The configuration of telecommunication switches usually occurs in at least three environments. First, during the testing of switch hardware and software, a laboratory switch is configured to the requirements established for the test. Second, when a switch is sold to a customer, the switch is configured to the customer's specifications. Third, when a switch experiences a full failure, it often requires reconfiguration of the databases supporting the failed switch or configuration of new databases for an emergency backup switch or replacement switch. Normally, the configuration of telecommunication switches during these three environments requires the manual input of thousands and possibly millions of records of information. This process is extremely time consuming and can take weeks or months to complete.

In the first environment, telecommunication companies continually test new versions of switch software, peripheral devices and other hardware devices during the life of a telecommunication switch. When testing software or hardware, switch engineers design different operating environments to establish operating parameters of the new software or hardware. Data engineers manually input data to configure the operation of the switch for the designed test. Usually, the configuration of the testing environment is performed on a data build machine (computer). The configuration of the switch to simulate the desired testing operational conditions often involves retesting archived configurations or modified archived configurations. Otherwise, the testing configuration is accomplished by manual data entry.

In the second environment, telecommunication switches sold to customers are configured based on the customer's intended operational conditions and requirements. Usually, the configurations for new switches are manually built new data configurations without relying on existing database configurations. However, the configuration of the features, switching software and hardware is often adopted from other existing configurations.

The third operational environment is recovery of the switch after the switch has experienced a failure. These failures can result from equipment failure to natural disasters such as earthquakes, hurricanes or fires. Recovery of the failed switch sometimes requires the installation of an emergency backup switch. The emergency backup switch requires database configurations that replicate the databases in the failed or damaged switch. Normally, the configuration of the emergency backup switch requires manual, time consuming input of data that will support specific customer features and routing of calls on the emergency backup switch. Having the ability to configure the telecommunication switch by transferring existing data information from known databases into new databases by automating the manual tasks of data entry would save considerable time, money and significantly improve productivity. In addition, instant access to many different switching systems is a critical task that currently requires many hours or days of research and manual browsing. A need exists for a robust process to automatically replace the current manual method data entry to configure dialing plan data for telecommunications switches.

SUMMARY

In order to automate the current manual data entry process of engineering dialing plan configuration databases, the computer program of this invention establishes a new database structure and mines source databases to load source database dialing plan data into the new dialing plan database structure. The computer program is capable of searching for the desired data and automates many of the tasks for configuring a new dialing plan database from multiple source databases. This eliminates the current requirement for manual data entry for configuring new dialing plan databases for telecommunication switches.

This computer program is multifunctional allowing for the browsing of all dialing plan databases prior to the configuration. Once the target source dialing plan databases are determined, the computer program creates a new data directory structure and selectively copies all or part of the data from the source dialing plan databases into the new database.

The invention selects the source databases, creates an index of desired data elements and converts the desired data elements from binary into ASCII format. The line and trunk information is configured for the new database and the equipment numbers are reengineered on each line and trunk member. The data is extracted and converted to the same software release and loaded into the new dialing plan data directory structure.

This computer program provides accurate and timely customer information, significantly decreases the time interval for engineering a new database, decreases the research and data entry time, decreases the interval for lab planning and project management, improves dialing plan database integrity, provides a cleaner dialing plan database, reuses existing dialing plan data eliminating double data entry, reuses some existing software code, can use preexisting tools, and provides a platform for future growth and expandability. By accomplishing these tasks, the telecommunication switch manufacturer or telecommunication switch operator saves time, money and decreases time-to-market product and service schedules.

DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DESCRIPTION OF THE PREFERRED EMBODIMENT

The following applications are filed concurrently and are also incorporated by reference:

1. Method and Apparatus for Creating and Modifying Similar and Dissimilar Databases (U.S. Ser. No. 09/053,957).

2. Method for Creating and Modifying Similar and Dissimilar Databases for use in Hardware Equipment Configurations for Telecommunication Systems (U.S. Ser. No. 09/054,207).

3. Method for Creating and Modifying Similar and Dissimilar Databases for use in Network Configurations for Telecommunication Systems (U.S. Ser. No. 09/053,961).

4. Method for Creating and Modifying Similar and Dissimilar Databases for use in Operator Services Configurations for Telecommunication Systems (U.S. Ser. No. 09/054,206).

5. Method for Creating and Modifying Similar and Dissimilar Databases for use in Private Branch Exchange Configurations for Telecommunication Systems (U.S. Ser. No. 09/054,193).

6. Method for Creating and Modifying Similar and Dissimilar Databases for use in Intelligent Network Configurations for Telecommunication Systems (U.S. Ser. No. 09/054,729).

7. Method for Creating and Modifying Similar and Dissimilar Databases for use in GSM Wireless Network Configurations for Telecommunication Systems (U.S. Ser. No. 09/054,324).

Figure 1:
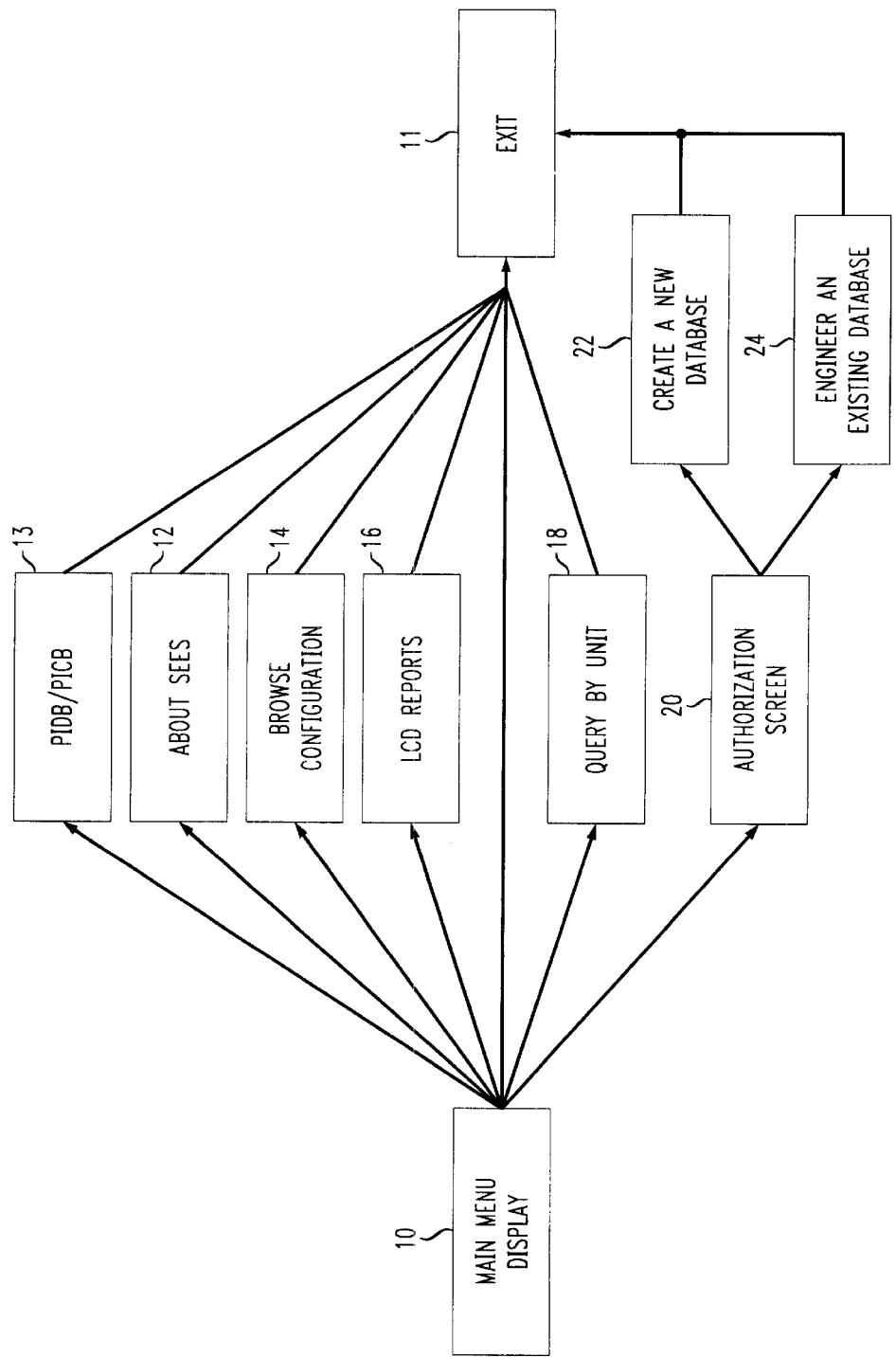
FIG. 1 is a functional flow chart illustrating the logical operations of the main menu of the computer program.

FIG. 1 illustrates the logical operation of the main menu of the user interface for the Simple Environment Engineering System ("SEES") computer program. If SEES is wrongly selected as the application of choice by the user, the main menu display 10 allows the user to exit 11 the computer program without choosing any of the functions. If the program is selected as the program of choice by the user, from the main menu display 10, the user can select from one of seven operations by the program.

These operations include: about SEES 12, peripheral interface data bus/peripheral interface control bus (PIDB/PICB) 13, browse feature 14, lab configuration document reports 16, query by unit 18, create a new database 22, or engineer an existing database 24. About SEES 12 is documentation about the computer program and the operations and features that a user can implement. Peripheral interface data bus (PIDB)/peripheral interface control bus (PICB) 13 allows a user to examine the peripheral units in the switching modules as they are connected to the interface control and data buses.

The browse feature 14 allows users to view the location and type of data in other databases. This feature allows the user to search for and find the desired data prior to generating new data from scratch. The lab configuration document reports 16 provide data on all the hardware for a given lab or for a customer's switch. Query by unit 18 identifies hardware items, features, signaling types, or other elements of the switch across many databases containing information on lab switches, manufacturers' switches, and/or customers' switches. Query by unit 18 also specifies and conforms targeting specific software releases to common versions.

The last two operations, create a new database and modify an existing database, have a guard dog or authorization screen 20 that prevents entry by unauthorized users into the program. Entry by unauthorized users beyond the browse feature impact existing source databases and source data resources. Allowing unauthorized users to create and modify existing source databases and source data resources can have severe effects on other operations due to the unintended destruction of valuable data. The computer program will query the user or the user's computer for authorization to gain access to those features of the computer program that allow for the creation or modification of dialing plan databases or data resources. Typical authorized users are data engineers. Once the screening process is complete, access is permitted, and another text or graphical user interface menu is displayed that allows the user to select features other than browse. From all six of these operations, a user can exit 11 the program.

The computer program uses all current data environments and employs functions to ensure that different versions of various software databases are converted to a common version. The Computer program provides accurate configuration information to customers on all environments to the switch module. The program uses an office data administration tool called "init-office" to insure a clean initial database structure. The program automatically updates the newest office data administration tool issues and environments.

Figure 2:
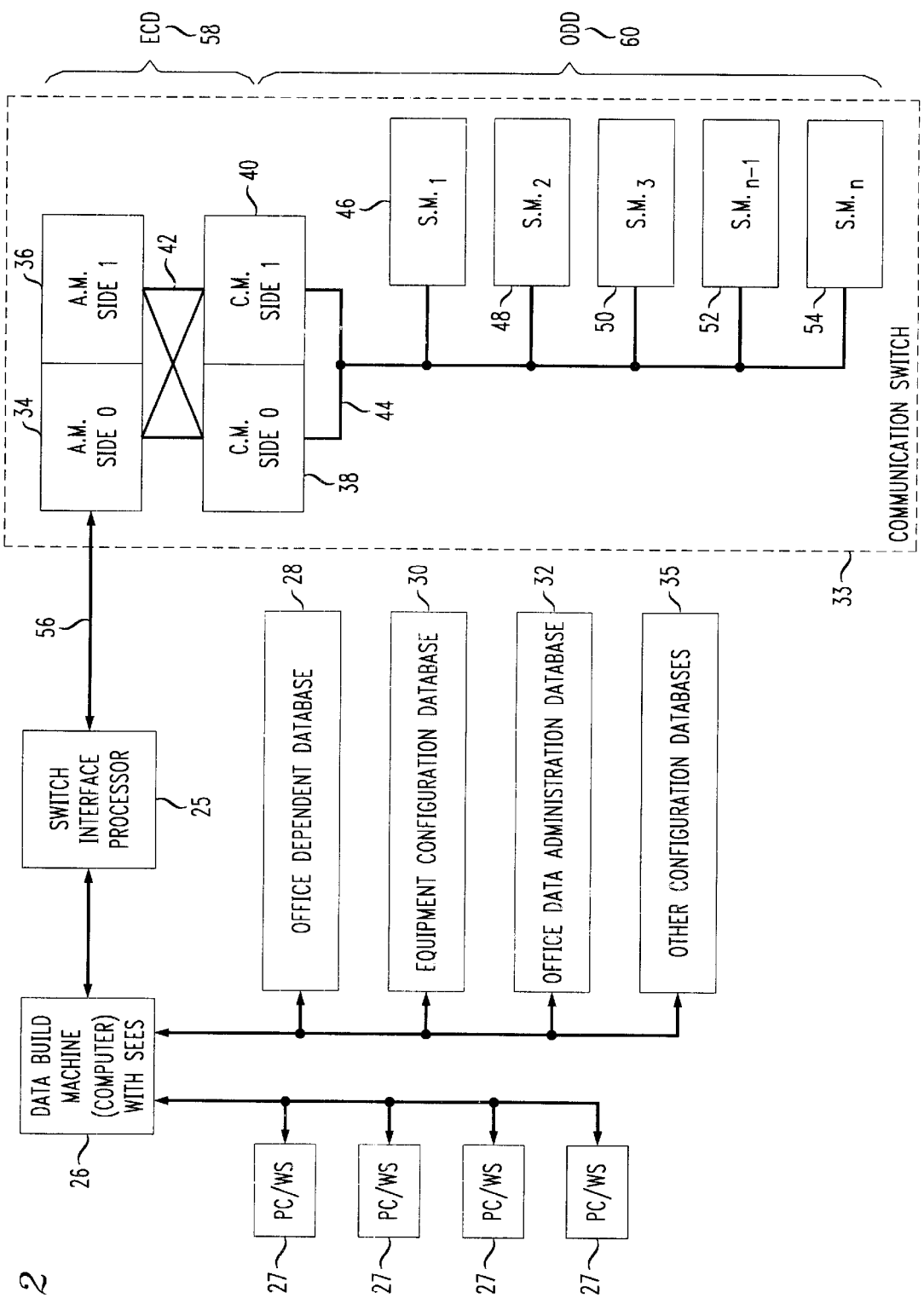
FIG. 2 illustrates the various hardware components and database types used in conjunction with the computer program.

FIG. 2 illustrates the various hardware components used in conjunction with a telecommunications switch 33. A data build machine 26 is used to create the data information used in the operation of a telecommunications switch 33. The data build machine 26 usually contains or has access to the source databases such the office dependant database 28, the equipment configuration database 30, the office data administration tools 32, and other configuration databases 35. The SEES computer program located on the data build machine 26 relies on various tools or routines to help in the execution of its operation.

Also connected to the data build machine 26 are a variety of personal computers or work stations 27. The data build machine 26 is also connected to a switch interface processor 25. The switch interface processor 25 is capable of connecting to other data build machines or communication switches 33. The connection 56 between the switch interface processor 25 and other communication switches 33 or data build machines can be a physical link such as a communication line (fiber, coaxial cable, twisted pair, etc.) or a nonphysical link such as transferring tapes or disks containing the data. Other communication links include radio frequency (RF) links by satellite transmission of data or wireless transmission of data.

Many telecommunication switches 33 have redundant administration modules represented by a zero side 34 and a one side 36. The redundant administrative modules 34 and 36 operate such that one of the modules is operating while the other one is on standby. If the operating administrative module fails, the administrative module on standby starts operating without causing a loss of services. This is also true for the redundant communication modules which have a zero side 38 and a one side 40. The administration modules 34 and 36 and the communication modules 38 and 40 are crossed linked by communication links 42. The cross linking of administration modules 34 and 36 with communication modules 38 and 40 eliminates the interruption of service should one of these modules fail. Connected via communication link 44 to the communication modules 38 and 40 are switch modules 46, 48, 50, 52 and 54. Each telecommunication switch 33 has at least one switch module (SM). The Lucent Technologies' 5ESS Switch, the switch can currently support up to 192 switch modules connected to the administrative modules 34 and 36 and communication modules 38 and 40.

The equipment configuration database 30 contains information regarding the administration modules 34 and 36 and part of the communication modules 38 and 40 (encompassing items corresponding to bracket 58 in FIG. 2). The equipment configuration database 30 keeps track of all the equipment hardware associated with the telecommunication switch 33 including the various equipment types of the hardware such as tape units, circuit packs, administration module links and disks containing the software versions used in conjunction with the hardware and all associated resources.

The office dependent database 28 contains information regarding part of the communication modules 38 and 40 and the switch modules 46, 48, 50, 52 and 54 (encompassing items corresponding to bracket 60 in FIG. 2). The office dependent database 60 is loaded on the memory disk in the administration modules 34 and 36 and is pumped or downloaded into the switch module memory. The office dependent database 60 provides call set up, functional feature capability of the switch modules, and defines all switch module hardware configuration information.

Figure 3:
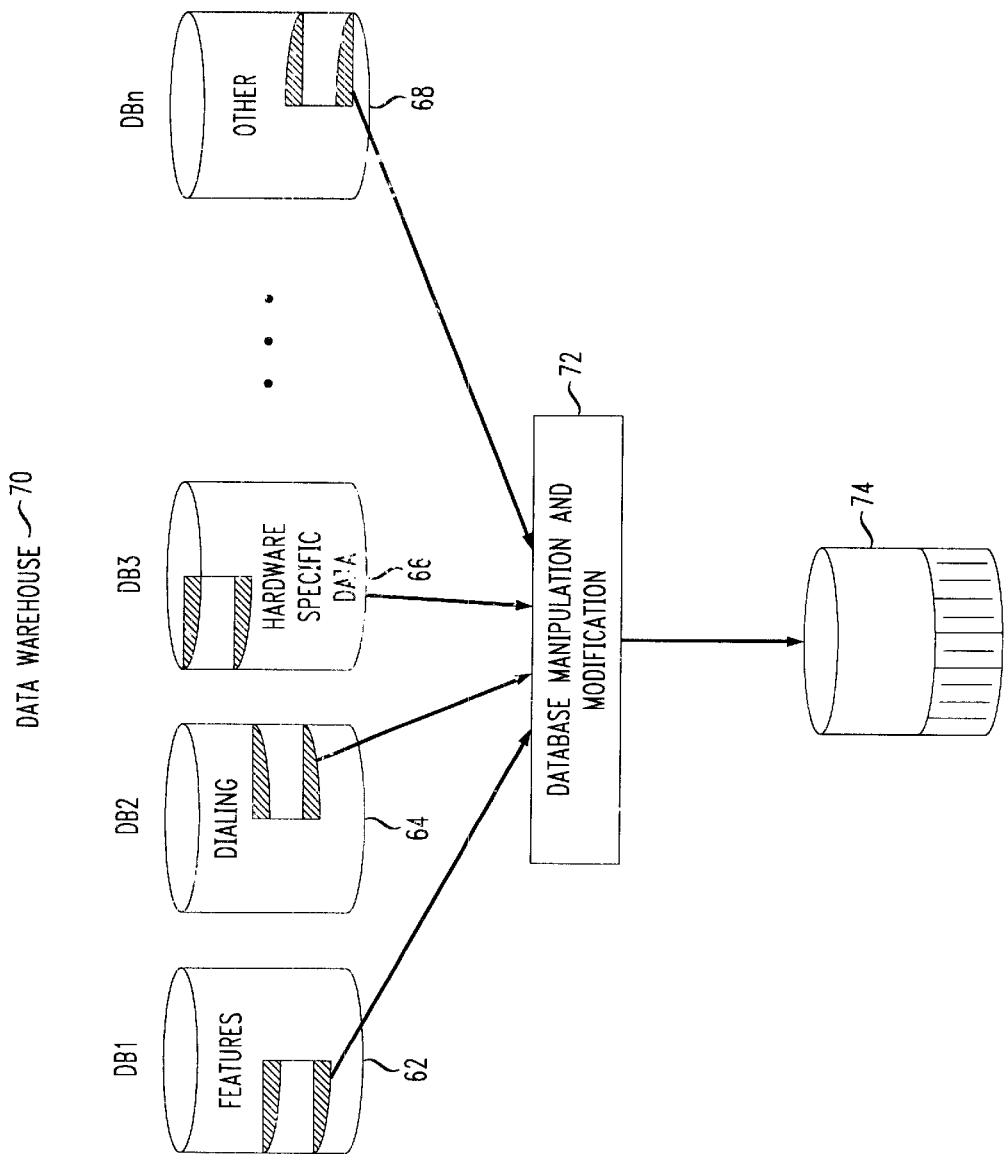
FIG. 3 illustrates the operation of the computer program as it builds a new database from parts of other databases.

FIG. 3 illustrates the operation of the Simple Environment Engineering System as it builds a new database from parts of other databases. In a typical setting, DB-1 62 contains information regarding features such as rate and routing information. DB-2 64 contains dialing information such as specific switch module configurations and networking rate and routing information. DB-3 66 contains hardware platform information such as additional switch module configurations. DB-n 68 are other databases in the data warehouse 70 containing information such as additional features or hardware. The computer program identification routines browse the data warehouse 70 looking for desired components for reuse. In the database section modifier 72, The computer program pulls new components from the various databases in the data warehouse 70 and with some modification such as altering the hardware designations for the software data, The computer program creates a new database 74.

Figure 4:
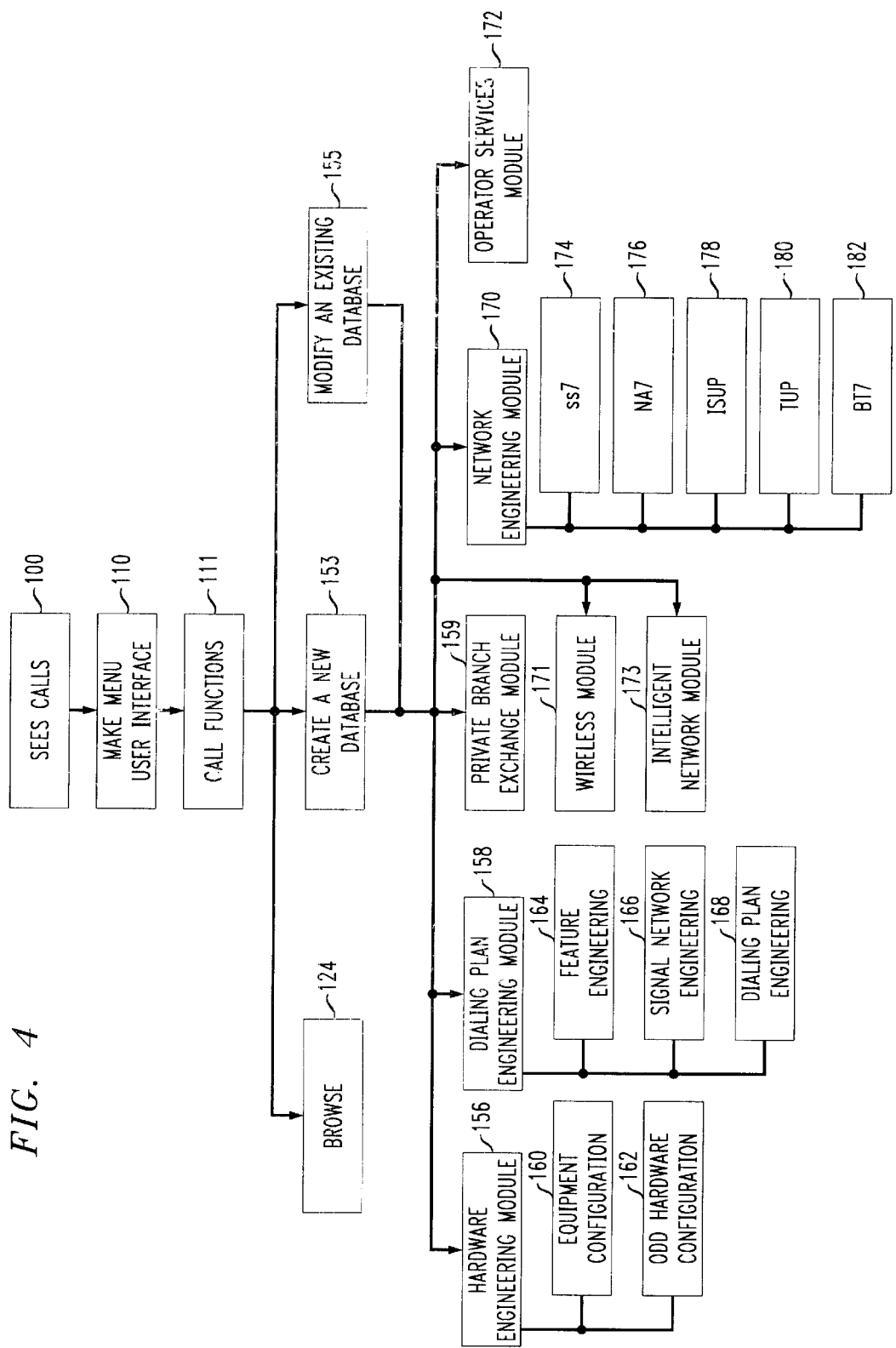
FIG. 4 is a flow chart of the overall features exercised in the operation of the computer program.

FIG. 4 illustrates the overall features of the computer program. "SEES calls" 100 is a routine that calls other components of the program such as the make menu (mk-menu) user interface routine 110. The Computer program' user interface allows a user to incorporate a variety of utilities including UNIX, web based languages, directories, databases, office data administration tools, DOS, and other applications. The make menu (mk_menu) routine 110 can be set up to use menu driven utilities employing streamlined commands, shortcuts, object menus, pictures or icons.

From the user interface screen 110, the user can call functions 111 that implement the various configuration features of the computer program. The browse feature 124 restricts users to a read only environment but because of this restriction, allows many more unsophisticated users to use. The computer program to view the various databases used in the operation of a telecommunication switch 33. For more sophisticated users who have authorization to get past the guard dog 20, the computer program queries as to whether a new database will be created 153 or whether an existing database will be modified 155. Either choice allows the user to select the seven configuration scheme features of the computer program.

The first feature of the computer program is the hardware engineering module 156. This module includes the equipment configuration block 160 that allows users to examine the properties of the administrative modules 34 and 36 and the communication modules 38 and 40 used in the operation of a telecommunication switch 33. The office dependent database hardware block 162 contains information allowing the communication between the communication modules 38 and 40 and the switch modules 46, 48, 50, 52 and 54.

The second feature of the computer program is the dialing plan engineering module 158. The dialing plan engineering module 158 includes the feature engineering block 164, the signal network engineering block 166 and the dialing plan engineering block 168. The feature engineering block 164 pulls existing features from other databases that contain feature definitions with embedded office dependant information into the new environment modified to the new database. The signal network engineering module 166 transfers data content regarding signaling information. The dialing plan engineering module 168 maps numbers that differentiate the route of the call and defines everything that is not hardware routing, trunking, lines, subscribers, and complete customer calling information.

The third feature of the computer program is the network engineering module 170. The network engineering module 170 includes the signaling system 7 (ss7) block 174, the NA7 block 176, the ISDN user part (ISUP) block 178, the TUP block 180 and the British Telecom 7 (BT7) block 182. Other blocks can also be added that focus on the international standard of particular countries or particular telecommunication companies.

The fourth feature of the computer program is the operator services feature 172. These services include but are not limited to directory assistance, automatic call distributor/distribution, toll and assistance applications, administrator measurements-operator, automated calling card services, automated operator trainer, automatic call distribution (ACD), busy line verification, and emergency alerts.

The fifth feature of the computer program is the private branch exchange module 159. The private branch exchange module 159 is used to configure databases related to private branch exchange networks.

The sixth feature of the computer program is the intelligent network module 173. The intelligent network module 173 includes the dialing plan module 158, the hardware engineering module 156, and the network engineering module 170. These three components should be implemented prior to performing an intelligent network configuration.

The seventh feature of the computer program is the wireless module 171. The wireless module 171 includes the dialing plan module 158, the hardware engineering module 156, and the network engineering module 170. These three components should be implemented prior to performing a wireless configuration.

Figure 5:
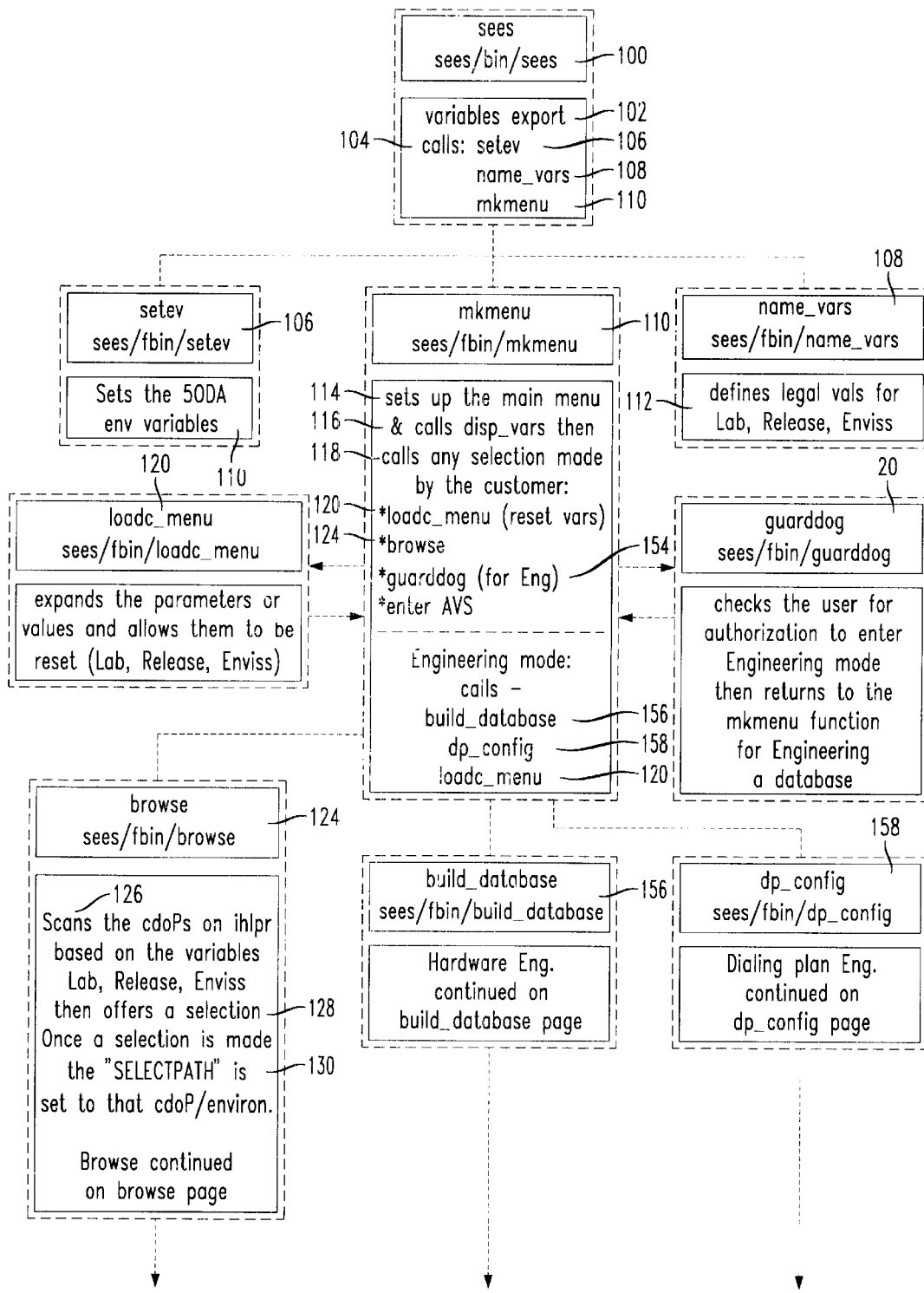
FIG. 5 is a flow chart of the logical operation of the computer program.

FIG. 5 is a flow chart of the logical operation of Simple Environment Engineering System. The computer program 100 accesses variables 102 by calling the setev routine 106, the name variable (name_vars) routine 108 and the make menu (mkmenu) routine 110. The setev routine 106 sets the office data administration variables. The setev routine 106 also sets the office data administration environmental variables that provides a description of the functionality that setev routine 106 provides. The name variable (name_vars) routine 108 sets certain variable values. The name variables (name_vars) routine 108 defines legal values 112 for lab, release and enviss. Lab is the total testing environment that simulates the product being sold to the customer. Release is the hardware, software options (SWOPT), equipment configuration database and the office dependant database relating to the telecommunication switch 33 being used by the computer program in the creation 153 or modification 155 of a database. The enviss routine is the environment tool version that the office data administration is supporting. The make menu (mkmenu) routine 110 sets up the main menu 114 and calls a display variable (disp_vars) routine 116, then calls any selection made by the user.

From the make menu (mkmenu) routine 110, the user can access the loadc_menu routine 120 that expands the parameters or values and allows them to reset lab, release and enviss. The make menu (mkmenu) routine 110 also allows the user to access browse 124, and the create a new database 153 or build an existing database 155. To access either create a new database or build an existing database, the user must first pass a guard dog 20. The guard dog 20 functions as a screen permitting only authorized users into these sensitive areas of the data build machine 26 to either create 153 or modify 155 databases. The browse feature 124 allows users to view hardware and software configurations on known telecommunication switches 33.

Figure 6:
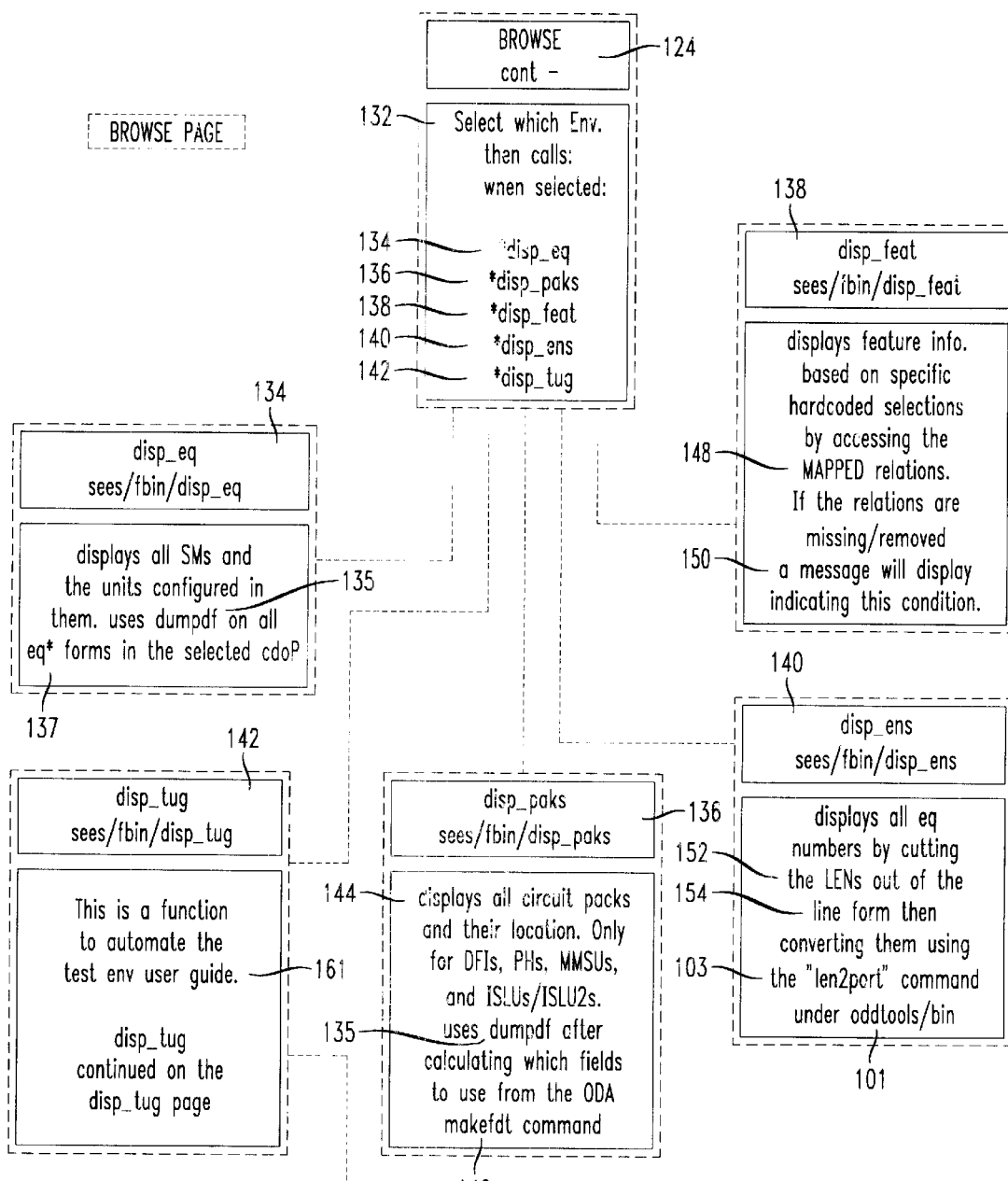
FIG. 6 is a flow chart of the browse feature of the computer program.

FIG. 6 illustrates the browse feature 124. The browse feature 124 allows the user to select the environment 132, then calls the display equipment (dis_eq) routine 134, the display packs (disp_paks) routine 136, the display features (disp_feat) routine 138, the display equipment number (disp_ens) routine 140 and the display the test user guide (disp_tug) routine 142. The display equipment (dis_eq) routine 134 displays all switch module and unit configuration within the switch module. The dumpdf routine 135 is used on all eq* forms (equipment related data) 137 in the selected circuit packs. The display packs (disp_pak) routine 136 displays all circuit packs 144 and their locations. The display packs (disp_paks) routine 136 uses dumpdf 135 after extracting the appropriate data to view from the office data administration makefdt command 146. The display feature (disp_feat) routine 138 displays the feature information based on specific hardcoded selections by accessing the mapped relations 148. If the mapped relations 148 are missing or removed, a message 150 will display indicating this condition. The display equipment number (disp_ens) routine 140 displays all equipment numbers by cutting the line equipment numbers 152 out of the data structures 154 and optionally, converts them using the len2port command 103 under oddtools/bin 101. The display test user guide (disp_tug) routine (optional) 142 automates the test environment user guide 161.

Figure 7:
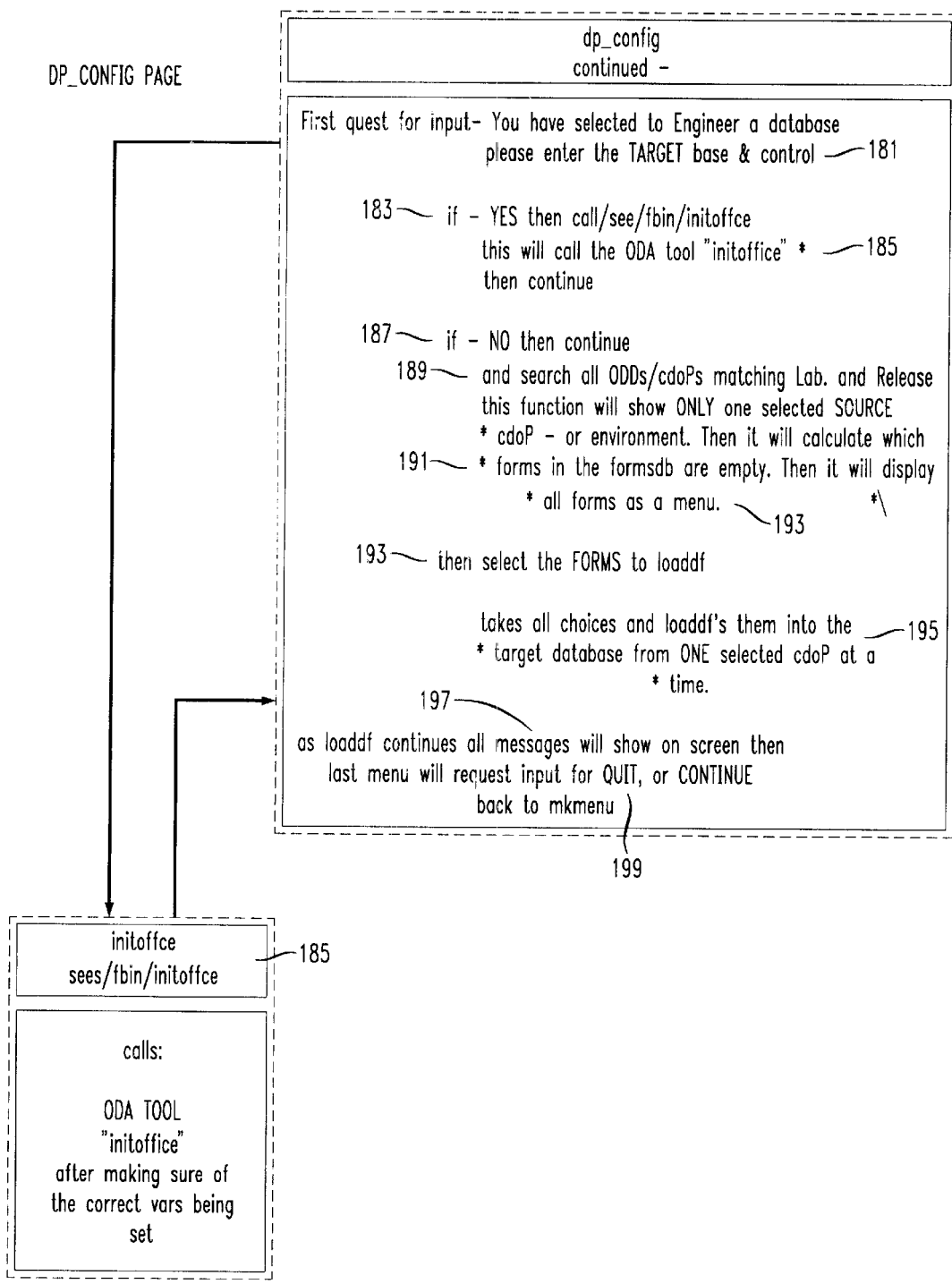
FIG. 7 is a flow chart of the dialing plan feature configuration of the computer program.

FIG. 7 illustrates the dialing plan configuration (dp_config) routine. The user is prompted for the target "base&control" 181. Base&control is the location where the new database is created and manipulated. If the user responds yes 183, then the computer program calls the office data administration tool initoffice 185. Init-office 185 builds a database structure containing no data. Init-office 185 calls an office data administration tool that confirms that the correct version of vars 108 is running. If the user responds no 187, then the computer program searches 189 all of the office dependent databases. This function will show only one selected source environment. Then it will determine those data elements in the data elements database that are empty 191. It will then display all data elements as a menu. The computer program then selects the data elements to load 193 and takes all choices and loads them into the new database structure 195. As the load process continues, all messages 197 will show on the screen then the last menu will request input for ending the dialing plan configuration 199.

Figure 8:
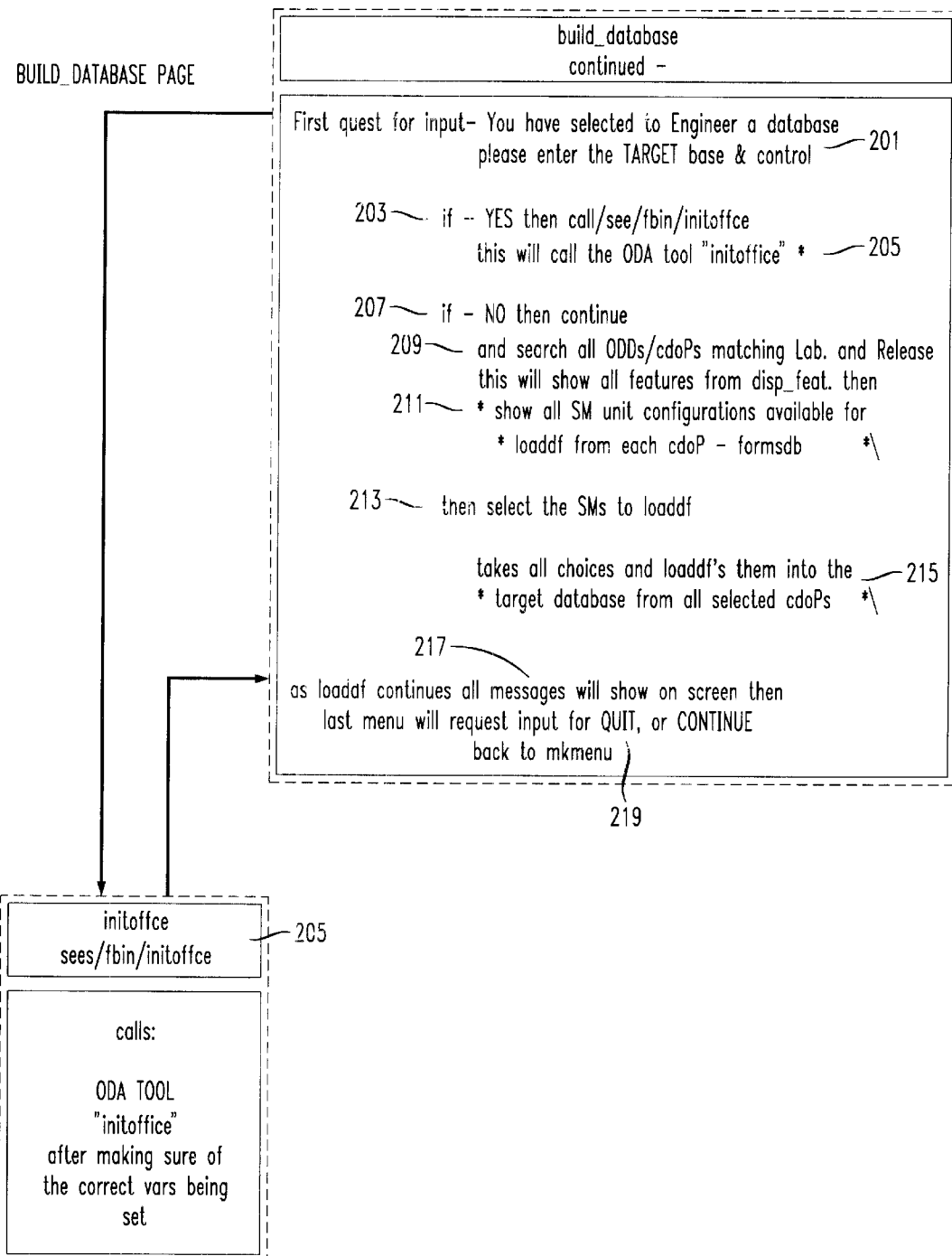
FIG. 8 is a flow chart of the build database operation for configuration of a database.

FIG. 8 illustrates the build database feature. The user is prompted for the target "base&control" 201. From the response to the new location 203, then the computer program calls the office data administration tool init-office 205. The init-office routine 205 builds a database structure containing no data. The init-office routine calls 205 an office data administration tool that confirms that the correct version of vars is running. If the user responds no 207, then the computer program searches 209 all of the office dependent databases. This function will show all features and display all switching module configurations available to load into the data elements 211. The program will then allow the user to select those switching modules to load in the new data structure 213. The program takes all the user selected choices and loads them into the new database structure 215. As the load process continues, all messages 217 will show on the screen then the last menu will request input for ending the dialing plan configuration 219.

Figure 9:
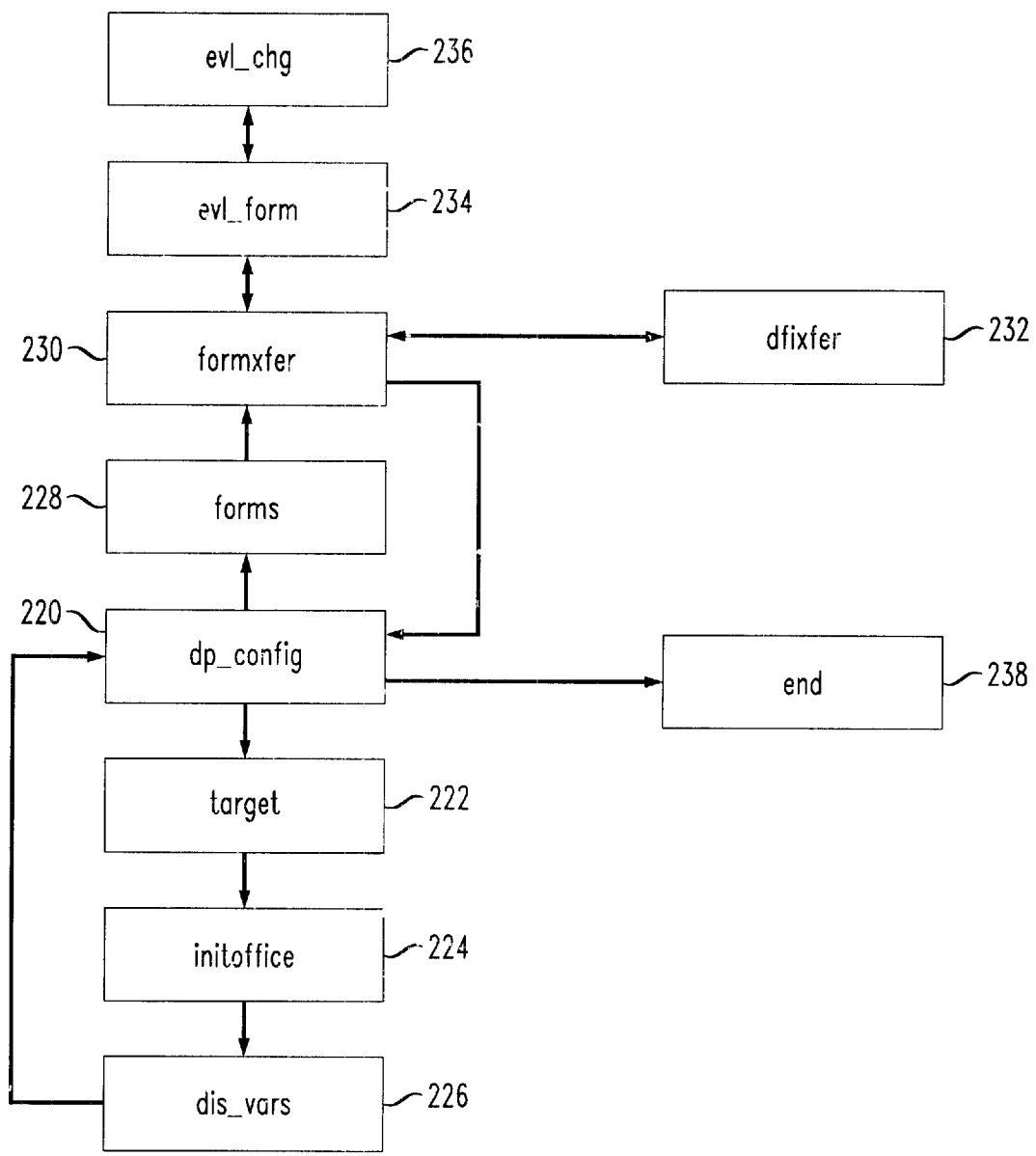
FIG. 9 is a flow chart of the build database operation for the dialing plan configuration.

FIG. 9 illustrates the dialing configuration (dp_config) feature 158 also starting from the engineering/create database. In the dialing plan (dp_config) feature 220, the dialing plan and feature engineering is accessed. The data is engineered from the office data administration tool data elements directly into the selected "base&control" or database. The computer program then prompts the user to select the target database 222. The computer program calls the initoffice routine 224 to check for an existing target database. Then prompts the user to select whether a predetermined database should be removed, or whether data should be added. If data is added to the predetermined database, then the existing database remains unchanged and a new database is created.

The computer program then calls the display variable (dis_vars) routine 226 to set and display selected variables. These include lab, office data administration tools version through the env_menu routine. This will be used to select the data from preexisting databases to be engineered into the target database. The computer program then takes the user back to the dialing configuration (dp_config) feature 220 to obtain a list of data elements 228 from the selected source database or "base&control." Only those data elements 228 with data contained will be shown as a selection. The computer program displays all of the selected data elements from the source database and allows the user to select the individual data elements manually. This is a menu type screen with each form dynamically identified and selectable by number. The computer program then copies or dumps the user selected data elements into the target database or "base&control." All data elements will be error checked before the dump or copy. If this is a new database, a copy of the existing database is created. If this is an append to an existing database, then the computer program dumps the data to the existing data elements. Existing data elements will be over written by default. The computer program then calls the formxfer routine 230.

The formxfer routine 230 takes the existing data elements and executes the work to transferring the data elements using the routine TARGETTL to support the loading of evolved data elements. The computer program then calls the evl_form routine 234 to perform any necessary evolves prior to trying to loading the form. If no evolve is required, then the computer program calls the Office data administration tool loaddf to transfer the data elements from the source to the target database.

The evlchg routine 236 takes one argument and the argument passed is the filename of the script that will be used to make the data changes when the evolve tool is executed. The computer program then calls the evl_form routine 234. The evl_form routine 234 takes two arguments. The first argument passed is the office data administration tool form name and the second argument is the filename where the contents of the office data administration tool form was dumped. This routine will check to see if there is a possible office data administration tools evolve to go between the two required generics and will perform all necessary step evolves to accomplish the tasks. The dfixfer 232 calculates the new trunk members in accordance with the new network or lab configuration form user assigned EN's. It will also differentiate between ENTRK1s, Ns, and trunk equipment numbers. If it is not, then ENTRK1 PASS is set to 1, so that the correct line in mkscript gets written to the SEDL script and conversely this also occurs for TRK1. This dynamically writes an evolve script, if a pathway exists, manipulating the data. The dfixfer routine 232 also checks for FIELDTYPE to determine if the last line to the SEDL script should be written. If the response is no, the computer program then returns to dp_config feature 220 after the evolve/transfer is completed. The computer program then prompts the user is the user wants to exit 238 or return to the main menu.

Figure 10:
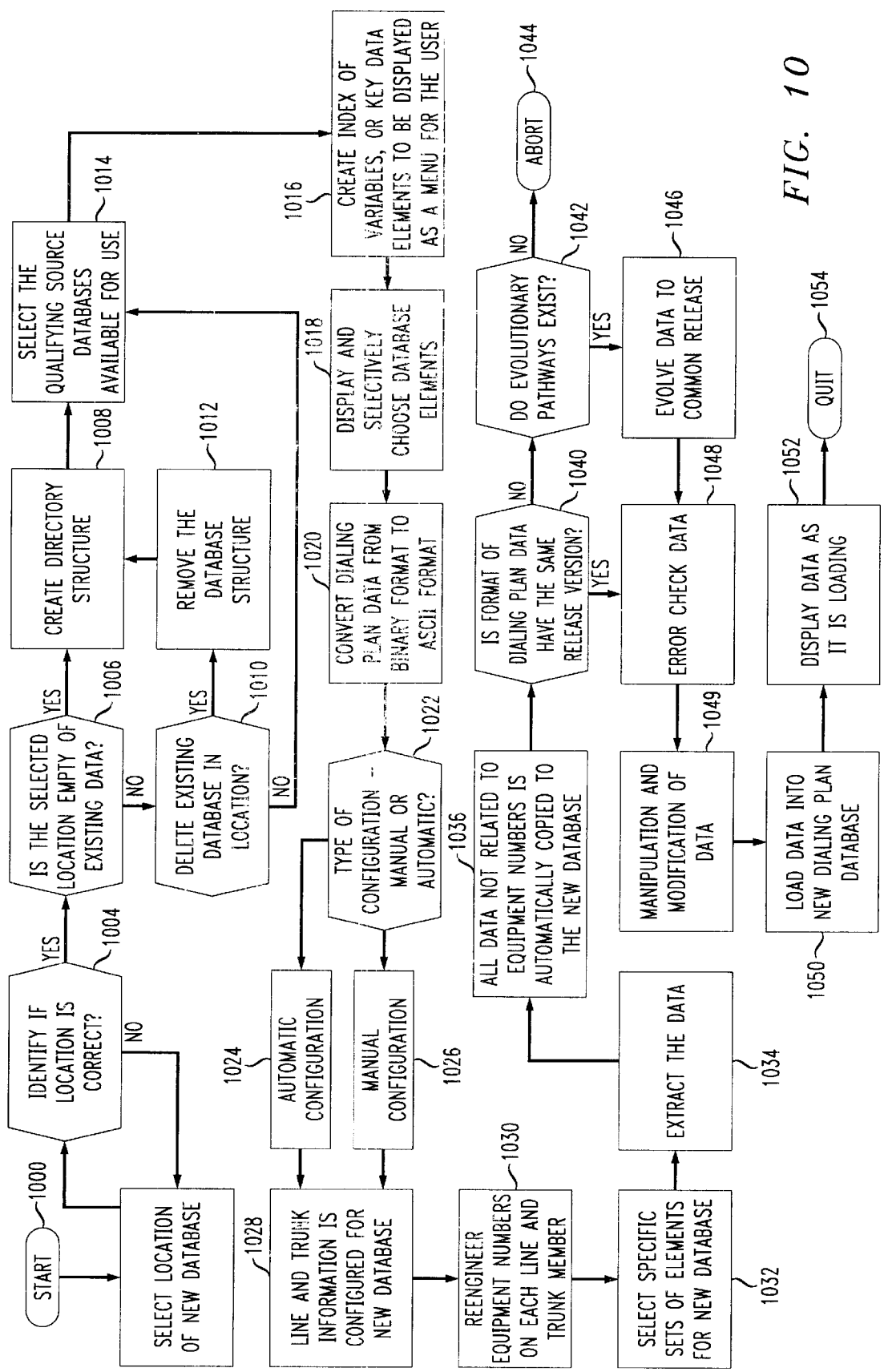
FIG. 10 is a flow chart of the process for engineering the dialing plan configuration from at least one source database.

FIG. 10 illustrates the process of engineering a new dialing plan configuration database or data resource from at least one source database or source data resource. The user calls and starts 1000 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the dialing plan engineering feature, the user is required to select the location of the new dialing plan database 1002. Selecting means selecting an item from a menu or inputting information such that the computer can react to the instruction. In addition, the user must select whether the new or modified dialing plan database should be located on the same machine (computer) or a virtual machine (computer), should the dialing plan database be created or modified, and whether the dialing plan database should be inclusively updated. The location of the new database 1002 is confirmed 1004 with the user and if the confirmation is not correct, the computer program allows the user to reselect a different location 1002.

The computer program searches or checks the node or location where the user intends for the new or modified dialing plan database to be located. This node check will confirm the actual location of the dialing plan database, and whether the node is free 1006 on the desired machine (computer). The computer program confirms whether the selected location of the new database is empty of existing data 1006. If the response from the user is yes, the computer program creates a new dialing plan directory structure 1008. If the response is no, the program allows the user to delete the existing database 1010. If the database is deleted, the program removes the database structure 1012 and creates a new dialing plan directory structure 1008. The dialing plan directory structure can be created to hold similar and dissimilar size data as compared to the source databases.

If the existing database structure is not deleted, or the program created a new dialing plan directory structure, the computer program then allows the user to select the qualifying source databases available for use 1014. The source databases might have access utilities to assist the in the configuration of a new database. The computer program then selects qualifying existing source data resources using the user set criteria in input when the user was prompted to select the lab, machine (computer), site, customer name, and software release. The computer program requires the user to select and input certain elements regarding the characteristics desired in the new dialing plan database to be created in order to search existing source databases and source data resources for existing data. For example, the user will be prompted to select the lab, the computer or machine, the site location of the new or modified dialing plan database, the customer name, the software release, and the version of the source database or source data resource.

Next, the computer program synchronizes the source database access utilities with the same versions that correspond to the existing source database or data source resource versions. This allows the source database access utilities to properly interface with the various existing source database or source data resource versions. The dialing plan data selected from the existing databases or data resources to be copied into the new, empty dialing plan data directory structure can be selected from related or unrelated data resource types.

An index 1016 is created of variables or key data elements and are displayed in a menu for the user. The computer program generates path locations (file pointers) to the location of each dialing plan data resource on the same or virtual machine (computer). All existing resources are then displayed 1018 to the user in a modified subset, easy to read type format, that satisfy the criteria selected by the user when the user was prompted to select the lab, machine (computer), site, customer name, and software release in creating the new dialing plan data resource, or merging with an existing data resource when the user selected the desired hardware engineering feature.

The dialing plan data encompasses digit analysis data such as routing digits, digit selectors, digit tables, and announcements. The routing digits can include announcements and signaling types. In addition, the digit analysis data can include billing types such as multimetering, and automated message accounting.

The dialing plan data can encompass subscriber equipment numbers such as originating subscriber equipment numbers and terminating subscriber equipment numbers. The dialing plan data can encompass trunk group data such as trunk member data that support the standard 24 channel and 36 channel pulse code modulation (PCM) multiplexing. The trunk member data can also include equipment numbers such as logical test port data capable of supporting virtual channels within a switching processor, recorded announcement equipment numbers linking subscribers to recorded messages, analog equipment numbers, digital equipment numbers (ISDN and interpacket traffic), packet switching equipment numbers, analog trunk equipment numbers, logical test port equipment numbers, and recorded announcement equipment numbers.

The user selectively chooses database elements and the program converts dialing plan data from binary format to ASCII format 1020. The resources queried in the computer program comprise key dialing plan data elements extracted from each resource being queried by using a utility for converting the dialing plan data in a binary format to an ASCII format and the ASCII formatted data is placed into a file for future use.

The computer program allows the user to select the type of configuration 1022, either automatic configuration 1024 or manual configuration 1026. The line and trunk information is configured for the new database 1028. The computer program reengineers the equipment numbers on each line and trunk member 1030 and allows the user select specific sets of data elements for the new dialing plan configuration database 1032 and the ASCII formatted data is placed into the memory structure. The data is extracted 1034 and all data not related to the equipment numbers is automatically copied into the new dialing plan configuration database 1036.

The computer program determines if this format is the same version or release as the new database structure 1040. This is accomplished by matching the selected criteria in the software release with the new or existing software release of the directory structure and name. If the format is not the same, the computer program determines if evolutionary pathways exist 1042. If the evolutionary pathways do not exist, the computer program aborts 1044. If the evolutionary pathways exist 1042, the program calls an evolution tool 1046, to modify the saved data so that consistency with the new location is maintained.

If the format is the same version or release as the new database structure 1040, or after the evolution of data has occurred 1046, the data is error checked 1048. The program dynamically manipulates and modifies the data 1049. All selected dialing plan data that is saved is loaded 1050 or merged into a new or existing dialing plan data resource using a platform utility that converts the data from an ASCII format to a binary format and loads the data into the database. The computer program displays 1052 all the statistics on the data elements as they are being loaded into the selected location. In addition, the computer program displays errors, updates, non-updates to the selected location data resource. The computer program then allows the user to return to the main menu or quit, (exit the program) 1054.

Please note that while the specification in this invention has been described in relation to certain preferred embodiments, it will be apparent to those skilled in the art that the invention is capable of alternative embodiments and that certain embodiments described in this invention can be varied considerably without departing from the basic scope and principles of the invention.

What is claimed is:

1. A process for configuring a dialing plan database comprising the steps of:
    searching a source database for digit analysis data fields;
    selecting digit analysis data from the digit analysis data fields;
    copying the digit analysis data from the source database to a new database; and
    matching subscribers to the digit analysis data in the new database.

2. The process for configuring the dialing plan database described in claim 1, where the digit analysis data from the source database is copied to a similar sized data structure in the new database.

3. The process for configuring the dialing plan database described in claim 1, where the digit analysis data from the source database is copied to a dissimilar sized data structure in the new database.

4. The process for configuring the dialing plan database described in claim 1, where the digit analysis data are routing digits data.

5. The process for configuring the dialing plan database described in claim 4, where the routing digits data are announcements data.

6. The process for configuring the dialing plan database described in claim 4, where the routing digits data are signaling types data.

7. The process for configuring the dialing plan database described in claim 1, where the digit analysis data are digit selectors data.

8. The process for configuring the dialing plan database described in claim 1, where the digit analysis data are digit tables data.

9. The process for configuring the dialing plan database described in claim 1, where the digit analysis data are announcements data.

10. The process for configuring the dialing plan database described in claim 1, where the digit analysis data are billing types data.

11. The process for configuring the dialing plan database described in claim 10, where the billing types data are multimetering data.

12. The process for configuring the dialing plan database described in claim 10, where the billing types data are automated message accounting data.

13. A process for configuring a dialing plan database comprising the steps of:
    searching a source database for subscriber equipment numbers data fields;
    selecting subscriber equipment numbers data from the subscriber equipment numbers data fields;
    copying the subscriber equipment numbers data from the source database to a new database; and
    matching subscribers to the subscriber equipment numbers data in the new database.

14. The process for configuring the dialing plan database described in claim 13, where the subscriber equipment numbers data from the source database is originating subscriber equipment numbers data.

15. The process for configuring the dialing plan database described in claim 13, where the subscriber equipment numbers data from the source database is terminating subscriber equipment numbers data.

16. A process for configuring a dialing plan database comprising the steps of:
    searching a source database for trunk group data fields;
    selecting trunk group data from the trunk group data fields;
    copying the trunk group data from the source database to a new database; and
    matching subscribers to the trunk group data in the new database.

17. The process for configuring the dialing plan database described in claim 16, where the trunk group data from the source database contains at least one trunk member data.

18. The process for configuring the dialing plan database described in claim 17, where the trunk member data is capable of supporting data for 24 channels of pulse code modulation multiplexing.

19. The process for configuring the dialing plan database described in claim 17, where the trunk member data is capable of supporting data for 36 channels of pulse code modulation multiplexing.

20. A process for configuring a dialing plan database comprising the steps of:
   searching for digit analysis data containing at least one trunk group data field from digit analysis data fields of at least source database;
   searching the at least one source database for the at least one trunk group data field containing at least one trunk member;
   searching the at least one source database for equipment numbers data in the at least one trunk member;
   selecting the equipment numbers data from the at least one trunk member;
   copying the equipment numbers data from the at least one trunk member in the at least one source database to a new database; and
   matching subscribers to the equipment numbers data in the new database.

21. The process for configuring the dialing plan database described in claim 20, where the equipment numbers data from the at least one source database is copied to a similar size data structure in the new database.

22. The process for configuring the dialing plan database described in claim 20, where the equipment numbers data from the at least one source database is copied to a dissimilar size data structure in the new database.

23. The process for configuring the dialing plan database described in claim 20, where the equipment numbers data contains logical test port data.

24. The process for configuring the dialing plan database described in claim 23, where the equipment numbers data contains logical test port data capable of supporting a virtual communication channel.

25. The process for configuring the dialing plan database described in claim 24, where the virtual channel is located within a switching processor.

26. The process for configuring the dialing plan database described in claim 20, where the equipment numbers data contains recorded announcement facility equipment numbers linking a subscriber to a recorded message.

27. The process for configuring the dialing plan database described in claim 20, where the equipment numbers data contains trunk equipment numbers supporting analog equipment.

28. The process for configuring the dialing plan database described in claim 20, where the equipment numbers data contains digital equipment numbers supporting ISDN traffic.

29. The process for configuring the dialing plan database described in claim 20, where the equipment numbers data contains digital equipment numbers supporting interpacket (IP) traffic.

30. The process for configuring the dialing plan database described in claim 20, where the equipment numbers data contains packet switching equipment numbers.

31. The process for configuring the dialing plan database described in claim 20, where the equipment numbers data contains digital trunk equipment numbers.

32. The process for configuring the dialing plan database described in claim 20, where the equipment numbers data contains analog trunk equipment numbers.

33. The process for configuring the dialing plan database described in claim 20, where the equipment numbers data contains logical test port equipment numbers.

34. The process for configuring the dialing plan database described in claim 20, where the equipment numbers data contains recorded announcement equipment numbers.

35. A process for configuring a dialing plan database consisting of the steps of:
   selecting a dialing plan database engineering computer program;
   selecting characteristics desired in the new dialing plan database;
   selecting a location of the new dialing plan database;
   creating a dialing plan data directory structure for the new dialing plan database capable of receiving new data copied from the at least one source database;
   selecting from the at least one source database, source data for copying into the dialing plan data directory structure;
   creating an index of data elements for the at least one source database;
   creating an index of digit analysis data contained in the selected at least one source database;
   converting the digit analysis data in the dialing plan data directory structure from a binary format to an ASCII format;
   copying the ASCII formatted digit analysis data into a memory structure;
   determining if the ASCII formatted digit analysis data of the at least one source database comprises the same version or release as the digit analysis data in the dialing plan data directory structure;
   evolving the ASCII formatted digit analysis data if the ASCII formatted data is not the same version or release;
   merging the ASCII formatted digit analysis data into the dialing plan data directory structure;
   converting the ASCII formatted digit analysis data to a binary formatted digit analysis data; and
   loading the binary formatted digit analysis data into the dialing plan data directory structure.

36. The process for configuring the dialing plan database described in claim 35, further comprising the step of locating the dialing plan database structure on one machine.

37. The process for configuring the dialing plan database described in claim 35, further comprising the step of locating the dialing plan database structure on multiple machines virtually connected via a network file share capability.

38. The process for configuring the dialing plan database described in claim 35, further comprising the step of locating the dialing plan database structure on multiple machines virtually connected via a network file share capability allowing all the virtual connected machines to appear as one machine and containing all existing the at least one source database.

39. The process for configuring the dialing plan database described in claim 35, further comprising the step synchronizing at least two source databases with the same version or release.

40. The process for configuring the dialing plan database described in claim 35, further comprising the step of checking the location where the new dialing plan data directory structure will be located for existence of pre-existing data.

41. The process for configuring the dialing plan database described in claim 35, where the at least one source database has access utilities.

* * * * *